(12) United States Patent
Weber (10) Patent No.: US 10,710,494 B2
(45) Date of Patent: Jul. 14, 2020

(54) VEHICULAR LIGHTING ASSEMBLY

(71) Applicant: Johnson Electric S.A., Murten (CH)

(72) Inventor: Daniel Weber, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/779,364

(22) PCT Filed: Nov. 25, 2016

(86) PCT No.: PCT/EP2016/078915
§ 371 (c)(1),
(2) Date: May 25, 2018

(87) PCT Pub. No.: WO2017/089598
PCT Pub. Date: Jun. 1, 2017

(65) Prior Publication Data
US 2018/0361913 A1 Dec. 20, 2018

(30) Foreign Application Priority Data

Nov. 26, 2015 (GB) .................................. 1520877.0

(51) Int. Cl.
*B60Q 1/00* (2006.01)
*B60Q 1/115* (2006.01)
*B60Q 1/076* (2006.01)

(52) U.S. Cl.
CPC ............ *B60Q 1/115* (2013.01); *B60Q 1/0023* (2013.01); *B60Q 1/076* (2013.01);
(Continued)

(58) Field of Classification Search
CPC ...... B60Q 1/115; B60Q 1/0023; B60Q 1/076; B60Q 2300/112; B60Q 2300/114; B60Q 2300/132
(Continued)

(56) References Cited

U.S. PATENT DOCUMENTS 6,450,673 B1    9/2002  Toda et al.
7,261,448 B2 *  8/2007  Ishida .................. B60Q 1/0041
                                                    362/507
(Continued)

FOREIGN PATENT DOCUMENTS

EP    2543541 A1 *  1/2013  ............... B60Q 1/10
EP    2543541 A1     1/2013
(Continued)

OTHER PUBLICATIONS

International Search Report dated Jan. 18, 2017 in connection with PCT Application No. PCT/EP2016/078915.
(Continued)

*Primary Examiner* — Gertrude Arthur Jeanglaude
(74) *Attorney, Agent, or Firm* — Millman IP Inc.

(57) ABSTRACT

A vehicular lighting assembly for compensating for the change in light emission angle due to load on a vehicle. The assembly included at least one lighting element, an actuator associated with the or each lighting element for adjusting a light emission angle of light emitted therefrom relative to the vehicle with which the vehicular lighting assembly is associated, and an actuator housing in which the actuator is housed. A vehicular-pitch-determining sensor is then arranged to indirectly determine a pitch of the vehicle, and associated with a controller for controlling an actuation of the actuator in response to a vehicular pitch as determined by the vehicular-pitch-determining sensor. A vehicular lighting system, pitch-compensation actuation unit, motor vehicle and method of altering the angle of light emission from the headlamps of a motor vehicle are also provided.

22 Claims, 5 Drawing Sheets

(52) U.S. Cl.
CPC .. *B60Q 2300/112* (2013.01); *B60Q 2300/114* (2013.01); *B60Q 2300/132* (2013.01)

(58) Field of Classification Search
USPC .......................................................... 701/49
See application file for complete search history.

(56) References Cited

U.S. PATENT DOCUMENTS

| | | | |
|---|---|---|---|
| 8,862,336 B2 * | 10/2014 | Dierks | B60Q 1/143 |
| | | | 701/49 |
| 2008/0112179 A1 | 5/2008 | Tatara et al. | |
| 2012/0014122 A1 | 1/2012 | Todani et al. | |
| 2012/0155098 A1 | 6/2012 | Kasaba et al. | |
| 2015/0048737 A1 * | 2/2015 | Schneider | B60Q 1/085 |
| | | | 315/82 |

FOREIGN PATENT DOCUMENTS

| | | | | |
|---|---|---|---|---|
| EP | 2708417 | A2 | 3/2014 | |
| EP | 2738041 | A2 | 6/2014 | |
| EP | 2945246 | A1 | 11/2015 | |
| FR | 2945246 | A1 | 11/2010 | |
| JP | 2002337600 | A * | 11/2002 | ............ B60Q 1/076 |
| JP | 2002337600 | A | 11/2002 | |
| KR | 1020090070726 | A | 7/2009 | |

OTHER PUBLICATIONS

English translation of FR 2945246.
English translation of JP 2002337600.
Search Report dated May 3, 2016 in connection with GB Application No. GB1520877.
English translation of Korean Patent Publication No. KR1020090070726.

* cited by examiner

VEHICULAR LIGHTING ASSEMBLY

CROSS-REFERENCE TO RELATED APPLICATIONS

This application is a national stage entry of International application PCT/EP2016/078915 filed Nov. 25, 2016, which claimed priority to GB application 1520877.0 filed Nov. 26, 2015.

FIELD OF THE INVENTION

The present invention relates to a vehicular lighting assembly, in particular but not necessarily exclusively for use as part of the headlights of a motor vehicle. The invention further relates to a vehicular lighting system, to a pitch-compensation actuation unit, to a motor vehicle having such a vehicle lighting assembly, and to a method of altering the angle of light emission from the headlamps of a motor vehicle.

BACKGROUND OF THE INVENTION

If a motor vehicle has an asymmetric load on its chassis, for instance, if the boot or trunk of the vehicle is heavily laden, then the vehicle will pitch out of the horizontal plane. Since vehicular headlights are calibrated to a given load which is deemed horizontal, any pitch of the vehicle will mean that a light emission angle from the vehicle will be skewed, which can result in glare to oncoming motorists, and/or incorrect illumination of the road surface. This is of particular concern in poor lighting conditions, such as at night or in foggy conditions.

Actuation units are known which are capable of altering the light emission angle of the headlamps in response to the asymmetric load. The pitch of the vehicle is determined in such systems by mounting a plurality of pitch sensors about the chassis of the vehicle, typically at or adjacent to the wheels, and then calculating a vertical displacement between the various sensors so as to determine an overall pitch of the vehicle.

Such systems require a plurality of pitch sensors which may need optical access to the road below and/or be otherwise exposed to the road surface below, for example, where the pitch sensors are formed as potentiometers mounted on the axles of the vehicle. This places various restrictions on the pitch sensors; firstly, the sensors must all be in communication, typically wired communication, with a controller which is able to calculate the pitch of the vehicle based on the output of the pitch sensors; and the pitch sensors are unable to be enclosed securely due to the requirements for exposure.

The positioning of the sensors about the chassis requires that a plurality of wires must be provided along the chassis. This wiring is prone to failure, particularly over extended periods of use and/or in harsh working conditions, which can result in failure of the actuator system as a whole. Furthermore, the requirements for exposure also mean that shielding is required for the pitch sensors, so as to prevent accidental damage from, for example, debris on the road surface.

SUMMARY OF THE INVENTION

The present invention seeks to provide solutions to provide an improved vehicle lighting assembly which allows for compensation of the laden pitch of a motor vehicle.

According to a first aspect of the invention, there is provided a vehicular lighting assembly for compensating for a change in light emission angle due to a load on a vehicle, the vehicular lighting assembly including: at least one lighting element; an actuator associated with the or each lighting element for adjusting a light emission angle of light emitted therefrom relative to the vehicle with which the vehicular lighting assembly is associated; an actuator housing in which the actuator is housed; and an actuator controller for controlling an actuation of the actuator; characterised by an indirect-vehicular-pitch-determining sensor in the actuator housing which indirectly determines a pitch of the vehicle from one or more characteristics other than pitch, the controller actuating the actuator in response to the indirectly-determined pitch.

An object of the invention is therefore to provide an autonomous procedure and device to determine at least one pitch or angle of a vehicle and to correct fluctuations with respect to a reference value. Determination of the pitch is done in a completely autonomous way, using only data measurements, for example, from an accelerometer. This procedure allows a very precise determination of the vehicle pitch.

By providing a vehicular lighting assembly in which an actuator is supplied having a vehicular-pitch-determining sensor which is able to indirectly determine the pitch of the vehicle, rather than by direct measurement of the displacement of the chassis with the road surface, it becomes possible to house the sensor in positions within the vehicle which do not have optical access to the road. In doing so, this can substantially reduce the wiring requirements of the vehicular lighting assembly, which can be the most common cause of failure in such a system.

Preferably, the vehicular-pitch-determining sensor may be or may include an accelerometer which is or at least in part includes a micro electro-mechanical system (MEMS) device.

Preferably, the actuator and vehicular-pitch-determining sensor may be co-located in or at the actuator housing.

By providing the vehicular-pitch-determining sensor so as to be co-located with the actuator, the wiring requirements therebetween can be minimised. This substantially increases the reliability of the vehicular lighting assembly.

In one embodiment, the actuator may be directly coupled to the or each lighting element, the light emission angle being adjusted by actuation of the or each lighting element. Alternatively, the vehicular lighting assembly may further includes a light directing element associated with the or each lighting element, the light directing element being coupled to the actuator, such that the light emission angle is adjusted by actuation of the light directing element.

There are several ways in which the actuator may be able to adjust the light emission angle. Direct coupling of the actuator to the lighting element may be the easiest way to alter the direction of light emission, but may result in a lighting assembly which is more prone to failure. On the other hand, indirect alteration of the light emission angle, for example, by providing an actuatable reflector or mirror, may require more components for the vehicular lighting assembly, but may result in a more reliable construction.

The vehicular-pitch-determining sensor may be or include an indirect pitch sensor for measuring a vehicular characteristic from which the vehicular pitch can be inferred or calculated. The vehicular-pitch-determining sensor may optionally include an accelerometer and/or a data input from a fuel consumption sensor, gas pedal angle sensor, or braking force sensor.

The means by which the vehicular-pitch-determining sensor is used to determine the pitch may be crucial to the operation of the vehicular lighting assembly. In particular, an accelerometer can be provided so as to be optically sealed and positioned very close to both the actuator and the controller of the vehicular lighting assembly. This results in a simple means by which the pitch can be accurately estimated indirectly. Secondary data may be coupled with the accelerometer measurements so as to improve the accuracy of the data; such secondary data may be indicative of a vehicular acceleration, such as fuel consumption, gas pedal angle or braking force, and may be derived, for example, from an electronic control unit of the motor vehicle.

Preferably, the controller may be located in or at the actuator housing, in which case the controller may be integrally formed with the actuator.

Positioning of the controller at or adjacent to the actuator beneficially improves the response time of the system in response to changes in vehicular pitch, which may in turn reduce the likelihood of oncoming drivers experiencing significant issues with glare from the vehicle.

The vehicular-pitch-determining sensor may be physically connected to the actuator. Furthermore, the vehicular-pitch-determining sensor may be fully enclosed within the actuator housing.

The positioning of the vehicular-pitch-determining sensor is important to the benefits of the present invention. By providing the sensor at or adjacent to the actuator, the sensing can occur well away from the wheels of the vehicle, where the risk of damage to the sensor or wires is significantly increased.

The actuator may include an electromechanical drive unit, and preferably, the lighting element may include a vehicular headlamp.

A plurality of lighting elements may be provided, the light emission angle of each lighting element being controlled by the actuator.

The provision of the lighting elements as part of a headlamp assembly means that the light emission angle from a vehicle can be adjusted so as to accommodate for the load on the vehicle, ensuring that the correct portion of the road is illuminated in use.

Preferably, the actuator may be arranged to adjust the light emission angle along more than one axis.

Ideally, the actuator is arranged so as to be able to reconfigure the light emission angle in response to a change in pitch in any of the Cartesian axes, since an asymmetric load could cause skew in any direction.

The system may further includes a vehicular speed determining sensor, the controller controlling an actuation of the actuator in response to a vehicular speed determined by the vehicular-speed-determining sensor.

By direct or indirect determination of the speed of the vehicle, the light emitted from the vehicular lighting system can be adaptively changed in response to changing driving conditions. For instance, the distance travelled by the headlight beams may be required to be greater when the vehicle is travelling at greater speed.

The controller may include an artificial neural network to determine the pitch of the vehicle whilst moving. The provision of such an artificial neural network allows for rapid calibration of the light emission angle following the initial acceleration of the vehicle.

According to a second aspect of the invention, there is provided a vehicular lighting assembly for compensating for a change in light emission angle due to a load on a vehicle, the vehicular lighting assembly including: at least one lighting element; an actuator associated with the or each lighting element for adjusting a light emission angle of light emitted therefrom relative to the vehicle with which the vehicular lighting assembly is associated; an actuator housing in which the actuator is housed; a vehicular-pitch-determining sensor arranged to indirectly determine a pitch of the vehicle; and a controller for controlling an actuation of the actuator in response to a vehicular pitch determined by the vehicular-pitch-determining sensor.

According to a third aspect of the invention, there is provided a vehicular lighting system including: a master vehicle lighting assembly, the master vehicle lighting assembly including a vehicle lighting assembly, preferably in accordance with the first aspect of the invention; and at least one slave vehicle lighting assembly, the or each slave vehicle lighting assembly having at least one slave lighting element and a slave actuator associated with the or each slave lighting element for adjusting a light emission angle therefrom relative to the vehicle with which the slave vehicular lighting system is associated; in which the or each slave vehicle lighting assembly is in controllable communication with the master vehicle lighting assembly, the light emission angle of the or each slave vehicle lighting assembly being controlled by the controller of the master vehicle lighting assembly.

Such a master-slave arrangement beneficially eliminates the need to provide individually and independently controlled actuators; only one vehicular-pitch-determining sensor is required to determine the pitch of the vehicular chassis, and therefore providing a plurality of vehicular lighting assemblies each having a vehicular-pitch-determining sensor is wasteful.

According to a fourth aspect of the invention, there is provided a pitch-compensation actuation unit for a vehicle lighting assembly, the pitch-compensation actuation unit including: an actuator having an output associable with a lighting element of a vehicle for adjusting a light emission angle of light emitted therefrom relative to the vehicle with which the vehicular lighting assembly is associated; an indirect-vehicular-pitch-determining sensor arranged to indirectly determine a pitch of the vehicle; a controller for controlling an actuation of the actuator in response to a vehicular pitch determined by the vehicular-pitch-determining sensor; and an actuation unit housing within which the actuator, vehicular-pitch-determining sensor and controller are housed.

A pitch-compensation actuation unit can be provided which can be installed separately to a lighting element which it is designed to control, or could even feasibly be retrofitted into vehicles having existing lighting elements.

According to a fifth aspect of the invention, there is provided a pitch-compensation actuation unit for a vehicle lighting assembly, the pitch-compensation actuation unit including: an actuator having an output associable with a lighting element of a vehicle for adjusting a light emission angle of light emitted therefrom relative to the vehicle with which the vehicular lighting assembly is associated; a vehicular-pitch-determining sensor arranged to indirectly determine a pitch of the vehicle; a controller for controlling an actuation of the actuator in response to a vehicular pitch determined by the vehicular-pitch-determining sensor; and an actuation unit housing within which the actuator, vehicular-pitch-determining sensor and controller are housed.

According to a sixth aspect of the invention, there is provided a motor vehicle including: a wheeled chassis; and at least one vehicular lighting assembly, preferably in accordance with the first aspect of the invention, the light emission angle of the or each vehicular lighting assembly being adjusted relative to a pitch of the wheeled chassis of the motor vehicle.

Preferably, only one single vehicular-pitch-determining sensor may be provided across the or each vehicular lighting assembly. Furthermore, a pitch of the wheeled chassis may be determined by a load on the motor vehicle.

Beneficially, a motor vehicle having only on vehicular-pitch-determining sensor eliminates the need to calculate the pitch of the vehicle by corroborating the measurements of a plurality of different vehicular-pitch-determining sensors. This reduces the cost of manufacture of the vehicle lighting assembly, whilst also minimising the risk of failure due to a fault in the connections.

According to a seventh aspect of the invention, there is provided a method of altering an angle of light emission from the headlamps of a motor vehicle, the method including the steps of: a] indirectly determining a pitch of the motor vehicle based on another characteristic of the motor vehicle other than pitch; b] calculating an optimum light emission angle for the headlamps based on the indirectly-determined pitch of the motor vehicle; and c] using an actuator to adjust the headlamps of the motor vehicle, such that an actual light emission angle is equal to or substantially equal to the optimum light emission angle.

The said another characteristic may include an acceleration of the motor vehicle, and/or the said another characteristic may include a fuel consumption, gas pedal angle, or braking force of the motor vehicle.

BRIEF DESCRIPTION OF THE DRAWINGS

The invention will now be more particularly described, by way of example only, with reference to the accompanying drawings, in which.

DETAILED DESCRIPTION OF THE PREFERRED EMBODIMENTS

Figure 1:
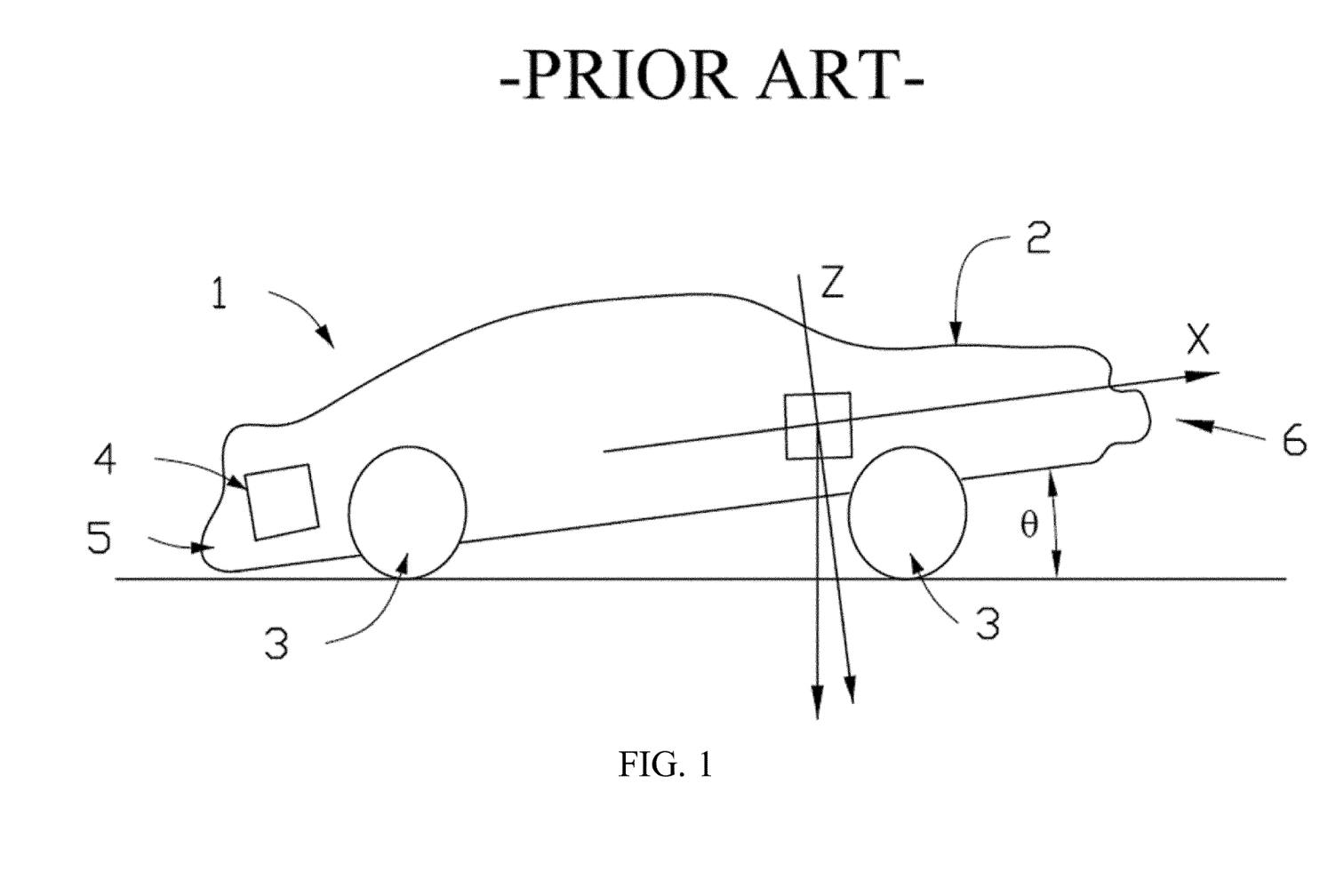
FIG. 1 shows a side pictorial representation of a laden motor vehicle having a pitch determining sensor, in accordance with the state of the art.

Referring firstly to FIG. 1, there is illustrated a motor vehicle as known in the art, indicated globally at 1. Such a motor vehicle 1 has a chassis 2 having a plurality of wheels 3 attached for rotation thereto.

Under normal load conditions, it is assumed that a horizontal axis of the wheeled chassis 2, indicated as X in FIG. 1, will remain horizontal to the ground, with a vertical, normal axis Z being parallel to the direction of gravitational force on the vehicle.

However, as illustrated in FIG. 1, under conditions of asymmetric load on the chassis 2, for instance, where a significant mass 4 is placed in the boot or trunk 5 of the motor vehicle 1, the pitch of the motor vehicle 1 may be significantly affected. As can be seen, the front end 6 of the motor vehicle 1 pitches significantly upwards, such that the axis X of the chassis 2 is inclined at an angle θ to the horizontal.

As the front end 6 of the motor vehicle 1 is pitched upwards, so too is the direction of the light emitted from the headlamps thereof. As such, a laden motor vehicle 1 is significantly more likely to blind or dazzle the driver of an oncoming vehicle via its inclined headlamps.

Figure 2:
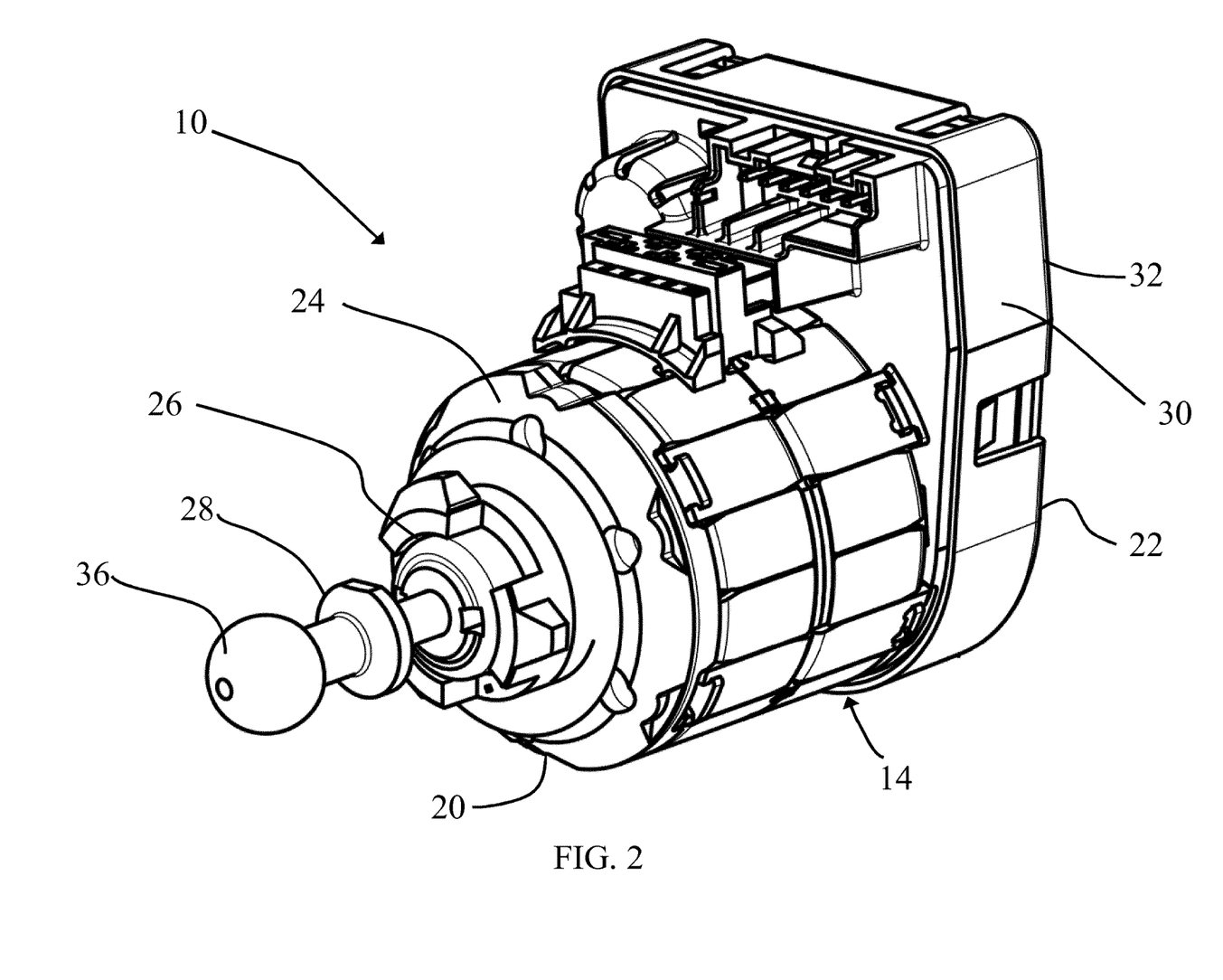
FIG. 2 shows a front perspective representation of one embodiment of a pitch-compensation actuation unit in accordance with the third aspect of the invention, for use with a vehicle lighting assembly in accordance with the first aspect of the invention.
Figure 3:
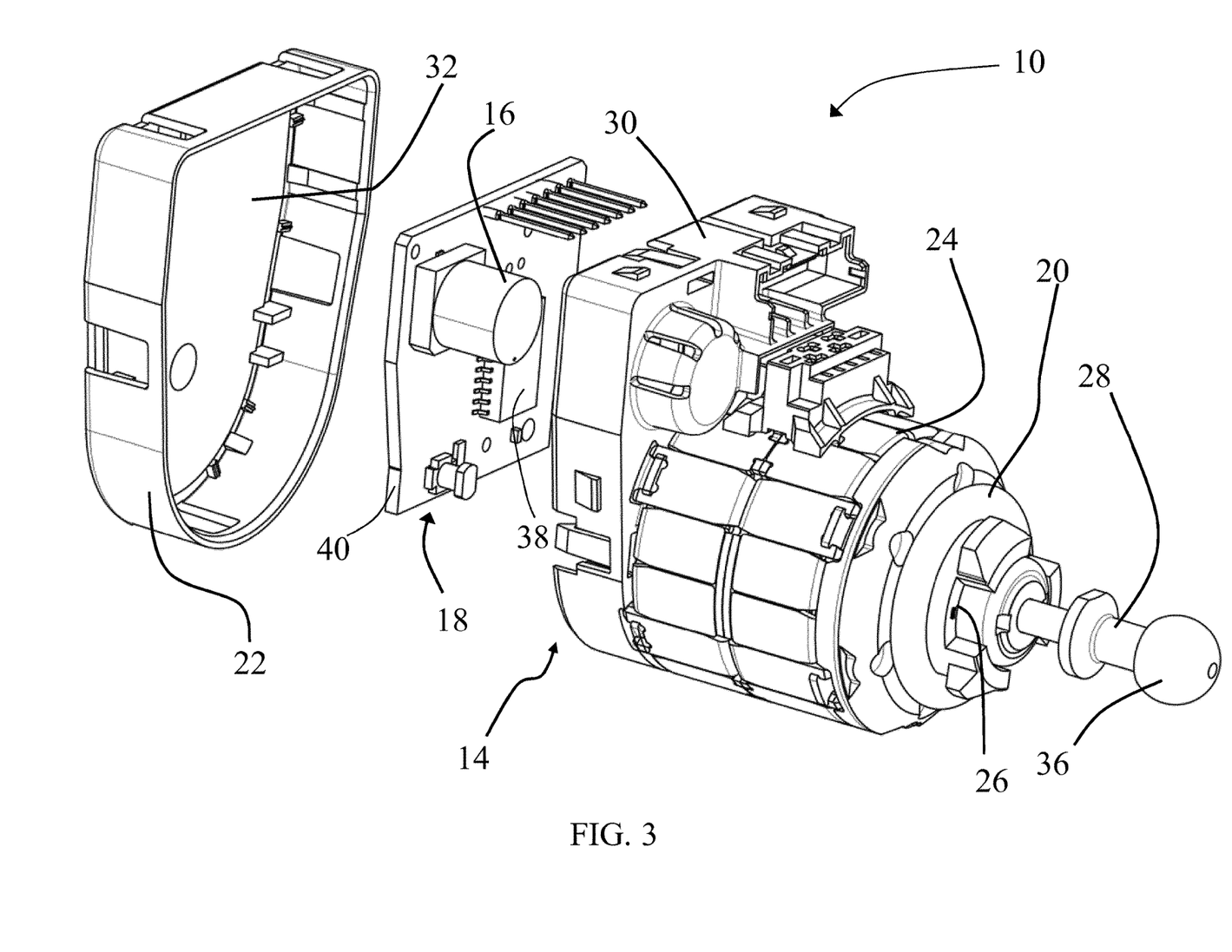
FIG. 3 shows a partially exploded front perspective representation of the pitch-compensation actuation unit of FIG. 2.
Figure 4:
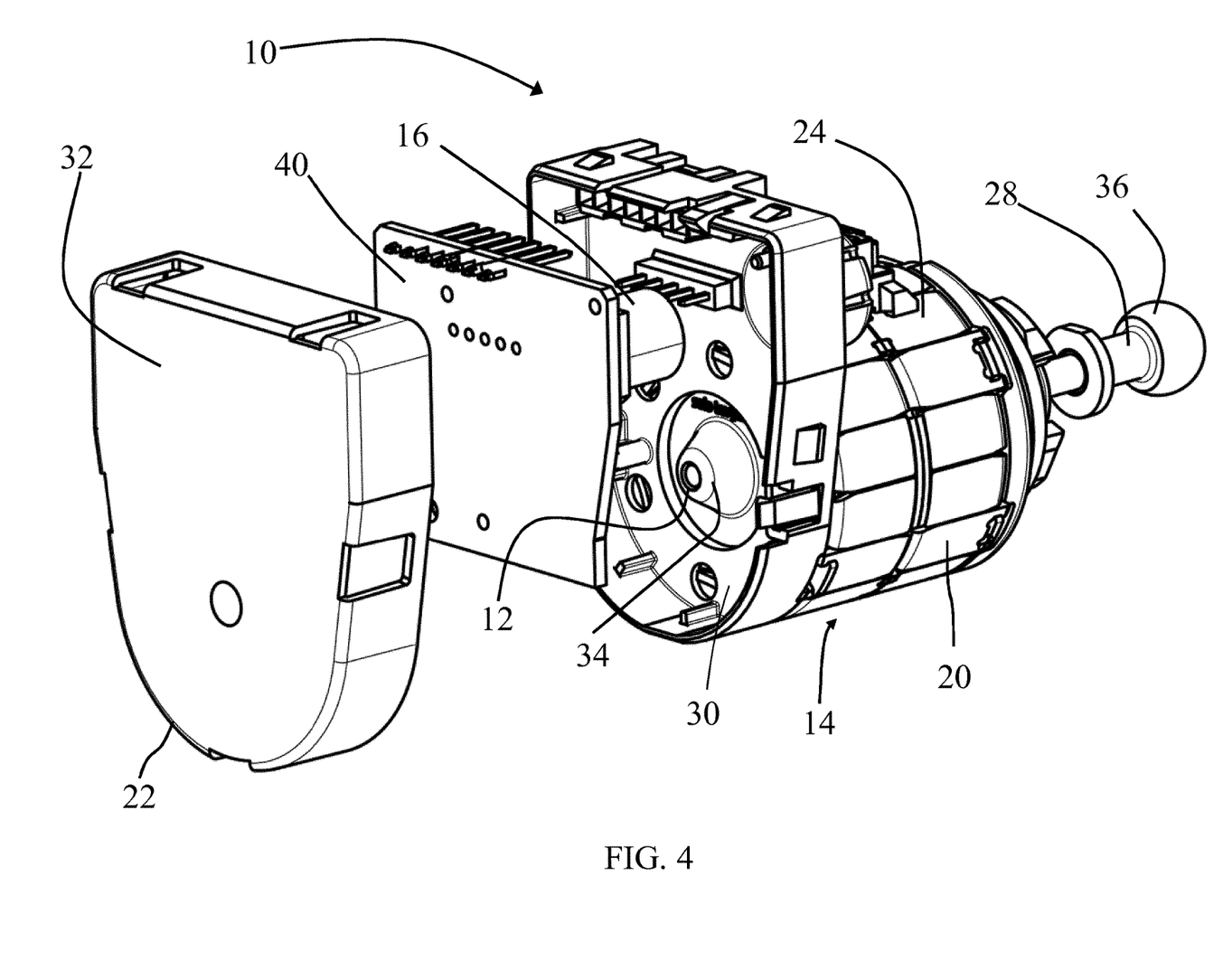
FIG. 4 shows a partially exploded rear perspective representation of the pitch-compensation actuation unit of FIG. 2.

In order to avoid this issue, a vehicular lighting assembly may be provided which incorporates a pitch-compensation actuation unit such as that globally referenced as 10 in FIGS. 2 to 4.

The pitch-compensation actuation unit 10 includes an actuator 12 which is associable with a lighting element of a motor vehicle, and an actuator housing 14 in which the actuator 12 is housed. Furthermore, a vehicular-pitch-determining sensor 16 is also provided associated with the actuator 12, at or adjacent to the actuator 12, and, as illustrated, preferably also housed within the actuator housing 14. A controller 18 is also provided, which may also be housed within the actuator housing 14.

The actuator housing 14 is here formed as a two-part housing having first and second housing body portions 20, 22 which are here releasably interengagable with one another. The first housing body portion 20 has a main actuator enclosure 24 which is shaped so as to house the actuator 12. The main actuator enclosure 24 is here preferably substantially cylindrical, having an opening 26 at one end through which an actuator output 28 may project. At the opposing end, there is a base enclosure 30 within which the vehicular-pitch-determining sensor 16 and controller 18 are preferably housed. The second housing body portion 22 is then formed as a base cover 32 which is engagable with the base enclosure 30 so as to complete the enclosure of the actuator housing 14.

The actuator 12 itself may include a motorised actuation unit, such as an electromechanical drive unit 34 as shown in FIG. 4, which is or is substantially housed within the main actuator enclosure 24, with the moveable actuator output 28 being formed so as to project out of the actuator housing 14. The actuator output 28 is here formed as an actuatable rod having a lighting element connector 36 positioned at a distalmost end. Here, this lighting element connector 36 is formed as a universal ball connector, allowing for manipulation along up to six axes of a lighting element which is connected thereto.

The vehicular-pitch-determining sensor 16 is here mounted with the controller 18; the controller 18 includes a control chip 38 mounted to a circuit substrate 40, here formed as a printed circuit board, and the vehicular-pitch-determining sensor 16 is mounted to this circuit substrate 40. The vehicular-pitch-determining sensor 16 may advantageously be formed as an accelerometer, for example, a piezoelectric accelerometer and/or a micro electro-mechanical system (MEMS) device, such as an accelerometer which is or is at least in part a MEMS device.

It will be appreciated, however, that the controller 18 and vehicular-pitch-determining sensor 16 do not necessarily need to be co-located; they merely need to be in electrical communication with one another such that the controller 18 is able to provide commands to the actuator 12 based on an output of the vehicular-pitch-determining sensor 16. The controller 18 could, for example, be readily provided so as to be integral to the actuator 12, which is then in wired or wireless communication with the vehicular-pitch-determining sensor 16.

Figure 5:
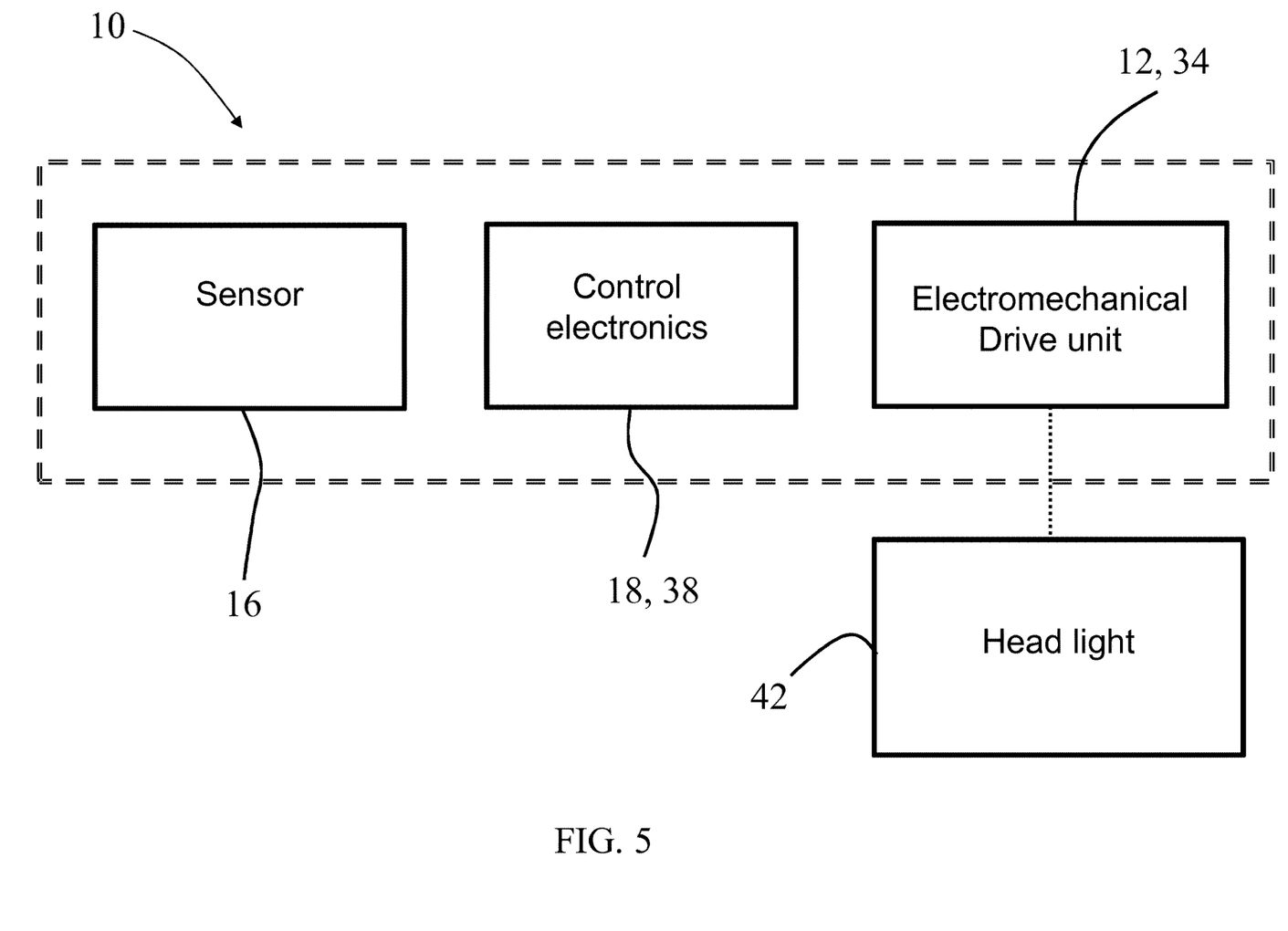
FIG. 5 shows a diagrammatic representation of one embodiment of a vehicle lighting assembly in accordance with the first aspect of the invention.

In use, the pitch-compensation actuation unit 10 is installed into a motor vehicle so as to be connected to at least one lighting element, as indicated in FIG. 5 at 42. The lighting element 42 may be directly actuatable, in which the light emission angle of a bulb of the lighting element 42, for instance, can be altered by actuation of the said bulb. Alternatively, there may be provided a light directing element, such as a reflector, which can be directly actuated to alter the light emission angle from a bulb, without requiring direct manipulation of the bulb.

The pitch-compensation actuation unit 10 operates to level the light emission angle from the lighting element 42, primarily in response to a given load on a motor vehicle within which it is installed. As the pitch of the motor vehicle changes due to a load thereon, the vehicular-pitch-determining sensor 16 is able to indirectly determine the pitch.

The controller 18 may include an artificial neural network which is utilised to determine a desired actuator 12 position to obtain a default position thereof. The artificial neural network is then able to learn the pitch and/or load of the motor vehicle in a very short period following initial motion of the motor vehicle.

In the depicted embodiment, the vehicular-pitch-determining sensor 16 is formed as an accelerometer. This has the advantage of being able to indirectly determine a pitch of the motor vehicle without requiring either optical access from the vehicular-pitch-determining sensor 16 to the road under the motor vehicle, or without requiring a plurality of individual sensors mounted at different positions on the chassis of the motor vehicle.

Where the vehicular-pitch-determining sensor 16 is formed as an accelerometer, it is able to measure a pitch or directionality of the compensation actuation unit 10 and therefore indirectly of the chassis of the motor vehicle in use. This pitch can be transmitted to the controller 18, which is then able to calculate a compensation angle which is required such that the light emitted by the lighting element 42 is equivalent to that of a motor vehicle which was unladen. This advantageously limits the likelihood of glare from a vehicle lighting assembly which included the lighting element being produced which would blind oncoming drivers.

It is possible that other or additional indirect means by which the pitch of a motor vehicle can be determined from characteristics other than pitch may be utilised. For instance, the vehicular-pitch-determining sensor 16 may be formed as, receive a data output from, or include a fuel consumption monitor, gas pedal angle sensor, and/or braking force sensor which is able to calculate the pitch of a vehicle based on a respective calculated fuel efficiency, gas pedal angle, and/or braking force thereof. Such sensors may be used to indirectly determine the vehicular pitch themselves, or more preferably may be used as secondary indicia of pitch, so as to improve the accuracy of the measurement provided by the accelerometer. Such secondary sensors may not necessarily be directly coupled to the actuator 12, in which case the more preferred arrangement may be to provide a communication means, such as a wired or wireless connection, from the fuel consumption monitor, gas pedal angle sensor, and/or braking force sensor to the actuator 12 and/or controller 18.

Furthermore, whilst an accelerometer is able to measure the acceleration in one or more given directions, a speedometer or velocity sensor could additionally or alternatively be provided so as to be able to measure the speed of the vehicle directly, and/or the speed could be inferred via the accelerometer. In such a scenario, where the speed of the vehicle is directly or indirectly determined, adaptive lighting functionality could be provided, in which the light is shone over a greater distance, for example, by extending the focal length of the beam, when the vehicle is travelling at greater speed. This can therefore be provided for by a vehicle-speed-determining sensor which is coupled to the controller 18 which then controls an actuation of the actuator 12 in response to a vehicular speed determined by the vehicular-speed-determining sensor.

It will be appreciated that it will be beneficial for each of the headlights of a motor vehicle to undergo pitch compensation in order to correctly alter the light emission angle of the lighting elements of the headlamps. Independent control of each of the lighting elements forming the headlamps may be costly and complex, and therefore it may be desirable to provide a system in which a single master vehicle lighting assembly is provided in a motor vehicle, with one or more slave vehicle lighting assemblies being provided which may have a more limited functionality.

In this case, the master vehicle lighting assembly will include a pitch-compensation actuation unit 10 in combination with a lighting element 42, as described above. This master vehicle lighting assembly therefore includes the vehicular-pitch-determining sensor 16 and controller 18, which is able to control the actuator 12.

On the other hand, the or each slave vehicle lighting assembly may only include an actuator which is connected with other lighting elements of the motor vehicle. Each slave vehicle lighting assembly may be in communication with the controller 18 of the master vehicle lighting assembly, which can then control all of the actuators 12 across the master and slave vehicle lighting assemblies concurrently.

In such an arrangement, it may be beneficial to provide at least one of the controller 18 and/or vehicular-pitch-determining sensor 16 so as to be physically dislocated from the master vehicle lighting assembly. This may advantageously limit the length of wired connections from the master vehicle lighting assembly to the slave vehicle lighting assembly.

Whilst the actuator output 28 of the actuator 12 is described as being releasably engagable with a lighting element 42, such as the bulb of a headlight, it will be readily apparent that the actuator output could be formed as part of the lighting element, thereby provided an integrated lighting assembly.

Whilst it may be possible to provide a plurality of vehicular-pitch-determining sensors 16 as part of a motor vehicle to which the vehicular lighting assembly is mounted, it will be appreciated that the provision of a single vehicular-pitch-determining sensor 16 on the vehicle is capable of accurately determining a pitch of the chassis of the motor vehicle for any or all actuators 12 provided. Although the vehicular-pitch-determining sensor 16 may preferably be part of the vehicular lighting assembly, the vehicular-pitch-determining sensor 16 may alternatively be located remotely from the assembly.

It is therefore possible to provide a vehicular lighting assembly which is automatically self-levelling in response to an asymmetric load on the chassis of a motor vehicle, thereby maintaining a correct light emission angle for the headlamps. This is achieved by providing a pitch-compensation actuation unit which is associated with a lighting element of the motor vehicle, which has a vehicular-pitch-determining sensor located therein to indirectly determine a pitch of the vehicle in order to control an actuation which will affect the light emission angle from the vehicle headlamps.

The words 'includes/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A vehicular lighting assembly for compensating for a change in light emission angle due to a load on a vehicle, the vehicular lighting assembly comprising:
   at least one lighting element;
   an actuator associated with the or each lighting element for adjusting a light emission angle of light emitted therefrom relative to the vehicle with which the vehicular lighting assembly is associated;
   an actuator housing in which the actuator is housed; and
   an actuator controller for controlling an actuation of the actuator,
   wherein an indirect-vehicular-pitch-determining sensor in the actuator housing which indirectly determines a pitch of the vehicle from one or more characteristics other than pitch, the controller actuating the actuator in response to the indirectly-determined pitch.

2. The vehicular lighting assembly as claimed in claim 1, wherein the vehicular-pitch-determining sensor is or includes an accelerometer which is or at least in part includes a micro electro-mechanical system (MEMS) device.

3. The vehicular lighting assembly as claimed in claim 1, wherein the actuator and vehicular-pitch-determining sensor are co-located in or at the actuator housing.

4. The vehicular lighting assembly as claimed in claim 1, wherein the actuator is directly coupled to the or each lighting element, the light emission angle being adjusted by actuation of the or each lighting element.

5. The vehicular lighting assembly as claimed in claim 1, further comprising a light directing element associated with the or each lighting element, the light directing element being coupled to the actuator, such that the light emission angle is adjusted by actuation of the light directing element.

6. The vehicular lighting assembly as claimed in claim 1, wherein the vehicular-pitch-determining sensor is or includes an indirect pitch sensor for measuring a vehicular characteristic from which the vehicular pitch can be inferred or calculated.

7. The vehicular lighting assembly as claimed in claim 6, wherein the vehicular-pitch-determining sensor includes an accelerometer.

8. The vehicular lighting assembly as claimed in claim 6, wherein the vehicular-pitch-determining sensor includes a data input from one or more of: a fuel consumption sensor; a gas pedal angle sensor; or a braking force sensor.

9. The vehicular lighting assembly as claimed in claim 1, wherein the controller is located in or at the actuator housing.

10. The vehicular lighting assembly as claimed in claim 9, wherein the controller is integrally formed with the actuator.

11. The vehicular lighting assembly as claimed in claim 1, wherein the vehicular-pitch-determining sensor is physically connected to the actuator.

12. The vehicular lighting assembly as claimed in claim 1, wherein the vehicular-pitch-determining sensor is fully enclosed within the actuator housing.

13. The vehicular lighting assembly as claimed in claim 1, wherein the actuator includes an electromechanical drive unit.

14. The vehicular lighting assembly as claimed in claim 1, wherein the lighting element includes a vehicular headlamp.

15. The vehicular lighting assembly as claimed in claim 1, wherein a plurality of lighting elements are provided, the light emission angle of each lighting element being controlled by the actuator.

16. The vehicular lighting assembly as claimed in claim 1, wherein the actuator is arranged to adjust the light emission angle along more than one axis.

17. The vehicular lighting assembly as claimed in claim 1, further comprising a vehicular speed determining sensor, the controller controlling an actuation of the actuator in response to a vehicular speed determined by the vehicular-speed-determining sensor.

18. The vehicular lighting assembly as claimed in claim 1, wherein the controller includes an artificial neural network to determine the pitch of the vehicle whilst moving; the artificial neural network is utilised to determine a desired actuator position to obtain a default position thereof, and the artificial neural network learns the pitch and/or load of the motor vehicle in a very short period following initial motion of the motor vehicle, and the artificial neural network allows for rapid calibration of the light emission angle following the initial acceleration of the vehicle.

19. A vehicular lighting system comprising:
    a master vehicle lighting assembly, the master vehicle lighting assembly including a vehicle lighting assembly as claimed in claim 18; and
    at least one slave vehicle lighting assembly, the or each slave vehicle lighting assembly having at least one slave lighting element and a slave actuator associated with the or each slave lighting element for adjusting a light emission angle therefrom relative to the vehicle with which the slave vehicular lighting system is associated;
    wherein the or each slave vehicle lighting assembly is in controllable communication with the master vehicle lighting assembly, the light emission angle of the or each slave vehicle lighting assembly being controlled by the controller of the master vehicle lighting assembly.

20. A method of altering an angle of light emission from the headlamps of a motor vehicle, the method comprising the steps of:
    a] indirectly determining a pitch of the motor vehicle based on another characteristic of the motor vehicle other than pitch;
    b] calculating an optimum light emission angle for the headlamps based on the indirectly-determined pitch of the motor vehicle; and c] using an actuator to adjust the headlamps of the motor vehicle, such that an actual light emission angle is equal to or substantially equal to the optimum light emission angle.

21. The method as claimed in claim 19, wherein the said another characteristic includes an acceleration of the motor vehicle.

22. The method as claimed in claim 19, wherein the said another characteristic includes one or more of: a fuel consumption; a gas pedal angle; or a braking force of the motor vehicle.

* * * * *